(12) United States Patent
Li

(10) Patent No.: US 8,028,234 B2
(45) Date of Patent: Sep. 27, 2011

(54) SUMMARIZATION OF SUMO VIDEO CONTENT

(75) Inventor: Baoxin Li, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 754 days.

(21) Appl. No.: 11/074,860

(22) Filed: Mar. 8, 2005

(65) Prior Publication Data
US 2005/0155053 A1    Jul. 14, 2005

Related U.S. Application Data

(62) Division of application No. 10/058,684, filed on Jan. 28, 2002, now Pat. No. 7,120,873.

(51) Int. Cl.
*G06F 3/00* (2006.01)
*H04N 9/80* (2006.01)
*H04N 5/92* (2006.01)

(52) U.S. Cl. ......... 715/719; 715/723; 386/241; 386/326

(58) Field of Classification Search ................... 715/723, 715/719; 725/37; 386/46, 241, 326
See application file for complete search history.

(56) References Cited

U.S. PATENT DOCUMENTS

| | | | |
|---|---|---|---|
| 4,183,056 A | 1/1980 | Evans et al. |
| 4,253,108 A | 2/1981 | Engel |
| 4,298,884 A | 11/1981 | Reneau |
| 4,321,635 A | 3/1982 | Tsuyuguchi |
| 4,520,404 A | 5/1985 | Von Kohorn |
| 4,729,044 A | 3/1988 | Kiesel |
| 4,937,685 A | 6/1990 | Barker et al. |
| 5,027,400 A | 6/1991 | Baji et al. |
| 5,101,364 A | 3/1992 | Davenport et al. |
| 5,109,482 A | 4/1992 | Bohrman |
| 5,148,154 A | 9/1992 | MacKay et al. |
| 5,200,825 A | 4/1993 | Perine |
| D348,251 S | 6/1994 | Hendricks |
| 5,333,091 A | 7/1994 | Iggulden et al. |
| 5,339,393 A | 8/1994 | Duffy et al. |
| D354,059 S | 1/1995 | Hendricks |
| 5,424,770 A | 6/1995 | Schmelzer et al. |
| 5,434,678 A | 7/1995 | Abecassis |
| 5,452,016 A | 9/1995 | Ohara et al. |
| D368,263 S | 3/1996 | Hendricks |

(Continued)

FOREIGN PATENT DOCUMENTS

JP    11-032267    2/1999

(Continued)

OTHER PUBLICATIONS

Daniel Dementhon, Bikrant Kobla and David Doermann, "Video Summarization by Curve Simplification," ACM Multimedia 1998, Language and Media Processing (LAMP), Univeristy of Maryland, College Park, MD 20742-3275, pp. 211-218.

(Continued)

*Primary Examiner* — Ting Lee
(74) *Attorney, Agent, or Firm* — Chernoff, Vilhauer, McClung & Stenzel

(57) ABSTRACT

Summarization of video content, such as a video that includes sumo, by a method that provides a description of the video, identifies a plurality of segments of the video based upon the provided description, and generates another video based upon the identified segments, having less frames than the original video.

2 Claims, 12 Drawing Sheets

U.S. PATENT DOCUMENTS

| | | | |
|---|---|---|---|
| 5,521,841 A | 5/1996 | Arman et al. | |
| 5,559,549 A | 9/1996 | Hendricks et al. | |
| 5,589,945 A | 12/1996 | Abecassis | |
| 5,600,364 A | 2/1997 | Hendricks et al. | |
| 5,600,573 A | 2/1997 | Hendricks et al. | |
| 5,610,653 A | 3/1997 | Abecassis | |
| 5,634,849 A | 6/1997 | Abecassis | |
| 5,635,982 A | 6/1997 | Zhang et al. | |
| D381,991 S | 8/1997 | Hendricks | |
| 5,654,769 A | 8/1997 | Ohara et al. | |
| 5,659,350 A | 8/1997 | Hendricks et al. | |
| 5,664,046 A | 9/1997 | Abecassis | |
| 5,664,227 A | 9/1997 | Muedin et al. | |
| 5,675,752 A | 10/1997 | Scott et al. | |
| 5,682,195 A | 10/1997 | Hendricks et al. | |
| 5,684,918 A | 11/1997 | Abecassis | |
| 5,696,869 A | 12/1997 | Abecassis | |
| 5,710,884 A | 1/1998 | Dedrick | |
| 5,717,814 A | 2/1998 | Abecassis | |
| 5,724,472 A | 3/1998 | Abecassis | |
| 5,734,853 A | 3/1998 | Hendricks et al. | |
| 5,761,881 A | 6/1998 | Wall | |
| 5,774,357 A | 6/1998 | Hoffberg et al. | |
| 5,778,108 A | 7/1998 | Coleman, Jr. | |
| 5,797,001 A | 8/1998 | Augenbraun et al. | |
| 5,798,785 A | 8/1998 | Hendricks | |
| 5,805,733 A | 9/1998 | Wang et al. | |
| 5,821,945 A | 10/1998 | Yeo et al. | |
| D402,310 S | 12/1998 | Hendricks | |
| 5,861,881 A | 1/1999 | Freeman et al. | |
| 5,867,386 A | 2/1999 | Hoffberg et al. | |
| 5,875,107 A | 2/1999 | Hoffberg et al. | |
| 5,875,108 A | 2/1999 | Hoffberg et al. | |
| 5,892,536 A | 4/1999 | Logan et al. | |
| 5,900,867 A | 5/1999 | Schindler et al. | |
| 5,901,246 A | 5/1999 | Hoffberg et al. | |
| 5,903,454 A | 5/1999 | Hoffberg et al. | |
| 5,913,013 A | 6/1999 | Abecassis | |
| 5,920,360 A | 7/1999 | Coleman, Jr. | |
| 5,920,477 A | 7/1999 | Hoffberg et al. | |
| 5,923,365 A | 7/1999 | Tamir et al. | |
| 5,926,624 A | 7/1999 | Katz et al. | |
| 5,933,811 A | 8/1999 | Angles et al. | |
| 5,956,026 A | 9/1999 | Ratakonda | |
| 5,958,006 A | 9/1999 | Eggleston et al. | |
| 5,959,681 A | 9/1999 | Cho | |
| 5,959,697 A | 9/1999 | Coleman, Jr. | |
| 5,969,755 A | 10/1999 | Courtney | |
| 5,973,683 A | 10/1999 | Cragun et al. | |
| 5,986,690 A | 11/1999 | Hendricks | |
| 5,986,692 A | 11/1999 | Logan et al. | |
| 5,987,211 A | 11/1999 | Abecassis | |
| 5,990,927 A | 11/1999 | Hendricks et al. | |
| 5,990,980 A | 11/1999 | Golin | |
| 5,995,095 A | 11/1999 | Ratakonda | |
| 6,002,833 A | 12/1999 | Abecassis | |
| 6,011,895 A | 1/2000 | Abecassis | |
| 6,014,183 A | 1/2000 | Hoang | |
| 6,038,367 A | 3/2000 | Abecassis | |
| 6,052,554 A | 4/2000 | Hendricks et al. | |
| 6,055,018 A | 4/2000 | Swan | |
| 6,067,401 A | 5/2000 | Abecassis | |
| 6,072,934 A | 6/2000 | Abecassis | |
| 6,081,750 A | 6/2000 | Hoffberg et al. | |
| 6,088,455 A | 7/2000 | Logan et al. | |
| 6,091,886 A | 7/2000 | Abecassis | |
| RE36,801 E | 8/2000 | Logan et al. | |
| 6,100,941 A | 8/2000 | Dimitrova et al. | |
| 6,141,041 A | 10/2000 | Carlbom et al. | |
| 6,141,060 A | 10/2000 | Honey et al. | |
| 6,144,375 A | 11/2000 | Jain et al. | |
| 6,151,444 A | 11/2000 | Abecassis | |
| D435,561 S | 12/2000 | Pettigrew et al. | |
| 6,160,989 A | 12/2000 | Hendricks et al. | |
| 6,161,142 A | 12/2000 | Wolfe et al. | |
| 6,169,542 B1 | 1/2001 | Hooks et al. | |
| 6,181,335 B1 | 1/2001 | Hendricks et al. | |
| 6,195,497 B1 | 2/2001 | Nagasaka et al. | |
| 6,201,536 B1 | 3/2001 | Hendricks et al. | |
| 6,208,805 B1 | 3/2001 | Abecassis | |
| 6,215,526 B1 | 4/2001 | Barton et al. | |
| 6,216,129 B1 | 4/2001 | Eldering | |
| 6,219,837 B1 | 4/2001 | Yeo et al. | |
| 6,230,501 B1 | 5/2001 | Bailey, Sr. et al. | |
| 6,233,389 B1 | 5/2001 | Barton et al. | |
| 6,236,395 B1 | 5/2001 | Sezan et al. | |
| 6,252,544 B1 | 6/2001 | Hoffberg | |
| 6,269,216 B1 | 7/2001 | Abecassis | |
| 6,275,268 B1 | 8/2001 | Ellis et al. | |
| 6,289,165 B1 | 9/2001 | Abecassis | |
| 6,304,665 B1 | 10/2001 | Cavallaro et al. | |
| 6,304,715 B1 | 10/2001 | Abecassis | |
| 6,342,904 B1 | 1/2002 | Vasudevan et al. | |
| 6,363,160 B1 | 3/2002 | Bradski et al. | |
| 6,418,168 B1 | 7/2002 | Narita | |
| 6,492,998 B1 | 12/2002 | Kim et al. | |
| 6,496,228 B1 * | 12/2002 | McGee et al. | 348/700 |
| 6,549,643 B1 | 4/2003 | Toklu et al. | |
| 6,556,767 B2 | 4/2003 | Okayama et al. | |
| 6,581,207 B1 * | 6/2003 | Sumita et al. | 725/46 |
| 6,585,521 B1 | 7/2003 | Obrador | |
| 6,597,859 B1 | 7/2003 | Leinhart et al. | |
| 6,665,423 B1 | 12/2003 | Mehrotra et al. | |
| 6,678,635 B2 | 1/2004 | Torinkere et al. | |
| 6,691,126 B1 | 2/2004 | Syeda-Manmood | |
| 6,724,933 B1 | 4/2004 | Lin et al. | |
| 6,774,917 B1 | 8/2004 | Foote et al. | |
| 6,829,781 B1 | 12/2004 | Bhagavath et al. | |
| 6,931,595 B2 | 8/2005 | Pan et al. | |
| 6,970,510 B1 | 11/2005 | Wee et al. | |
| 6,981,129 B1 | 12/2005 | Boggs et al. | |
| 6,993,245 B1 | 1/2006 | Harville | |
| 7,181,757 B1 * | 2/2007 | Kim et al. | 725/61 |
| 7,203,620 B2 | 4/2007 | Li | |
| 7,221,780 B1 | 5/2007 | Wang | |
| 2002/0013943 A1 | 1/2002 | Haberman et al. | |
| 2002/0018594 A1 | 2/2002 | Xu et al. | |
| 2002/0051077 A1 * | 5/2002 | Liou et al. | 348/465 |
| 2002/0080162 A1 | 6/2002 | Pan et al. | |
| 2002/0081062 A1 | 6/2002 | Pan et al. | |
| 2002/0083471 A1 * | 6/2002 | Agnihotri et al. | 725/137 |
| 2002/0083473 A1 | 6/2002 | Agnihotri et al. | |
| 2002/0111968 A1 * | 8/2002 | Ching | 707/514 |
| 2002/0114394 A1 | 8/2002 | Ma | |
| 2002/0120929 A1 | 8/2002 | Schwalb et al. | |
| 2002/0141619 A1 * | 10/2002 | Standridge et al. | 382/107 |
| 2002/0144293 A1 | 10/2002 | Dimitrova et al. | 725/133 |
| 2002/0163911 A1 * | 11/2002 | Wee et al. | 370/389 |
| 2002/0180774 A1 | 12/2002 | Errico et al. | |
| 2002/0184220 A1 | 12/2002 | Teraguchi et al. | |
| 2002/0194589 A1 | 12/2002 | Cristofalo et al. | |
| 2003/0001880 A1 | 1/2003 | Holtz et al. | |
| 2003/0026592 A1 | 2/2003 | Kawhara et al. | |
| 2003/0027121 A1 | 2/2003 | Grudnitski et al. | |
| 2003/0081937 A1 | 5/2003 | Li | |
| 2003/0225696 A1 * | 12/2003 | Niwa | 705/50 |
| 2004/0017389 A1 | 1/2004 | Pan et al. | |
| 2004/0088289 A1 | 5/2004 | Xu et al. | |
| 2004/0125124 A1 | 7/2004 | Kim et al. | |
| 2004/0125877 A1 | 7/2004 | Chang et al. | |
| 2004/0227768 A1 | 11/2004 | Bates et al. | |
| 2004/0255249 A1 * | 12/2004 | Chang et al. | 715/723 |
| 2007/0101266 A1 * | 5/2007 | Kim et al. | 715/719 |

FOREIGN PATENT DOCUMENTS

| | | |
|---|---|---|
| JP | 11-261908 | 9/1999 |
| JP | 2000-013755 | 1/2000 |
| WO | WO 99/65237 | 12/1999 |

OTHER PUBLICATIONS

Y. Kawai, et al., "Detection of Replay Scenes in Broadcasted Sports Video by Focusing on Digital Video Effects," IEICE (D-II), vol. J84-D-II, No. 2, pp. 432-435, Feb. 2001 (in Japanese).

Richard O. Duda and Peter E. Hart, "Use of the Hough Transformation To Detect Lines and Curves in Pictures." Stanford Research Insitute, Menlo Park, California, 1972, Association for Computing Machinery, Inc., pp. 11-15.

www.pvi.com, at least one year prior to filing.

Chung-Lin Huang and Chih-Yu-Chang, "Video Summarization using Hidden Markov Model," Electrical Engineering Department, Nationala Tsing-Hua University, Hsin-Chu, Taiwan, ROC, 2001, IEEE, pp. 473-477.

Alan E. Bell, "The dynamic digital disk," IEEE Spectrum, Oct. 1999, pp. 28-35.

International Organization for Standardization, ISO/IEC JTC1/SC29/WG11/N3399, Coding of Moving Pictures and Associated Audio, "Visual Working Draft 3.0," Jun. 2000, Geneva.

International Organisation for Standardisation, ISO/IEC JTC1/SC29/WG11/N3398, Coding of Moving Pictures and Associated Audio Information, "MPEG-7 Visual Part of eXperimentation Model Version 6.0," Jun. 2000, Geneva.

International Organization for Standardization, ISO/IEC JTC 1/SC 29/WG 11/N3410, Coding of Moving Pictures and Audio, MPEG-7 Multimedia Description Schemes XM (Version 3.0), May 2000, Geneva.

International Organization for Standardization ISO/IEC JTC 1/SC 29/WG 11/N3411, Coding of Moving Pictures and Audio, MPEG-7 Multimedia Description Schemes WD (Version 3.0), May 2000, Geneva.

International Organization for Standardization,ISO/IEC JTC1/SC29/WG11/N3391, Coding of Moving Pictures and Associated Audio, "DDL Working Draft 3.0," May 2000., Geneva.

International Organisation for Standardisation,ISO/IEC JTC1/SC29/WG11/N2844, Coding of Moving Pictures and Audio Information, "MPEG-7 Description Schemes (V0.5)," Jul. 1999, Vancouver.

International Organisation for Standardisation, ISO/IEC JTC1/SC29/WG11/MXXXX, MPEG-7 Media/Meta DSs upgrade (V02.), Oct. 1999, Melbourne.

ISO/IEC JTC 1/SC 29 N3705, "Information Technology—Multimedia Content Description Interface—Part 5: Multimedia Description Schemes," Nov. 17, 2000.

International Organization for Standardization, ISO/IEC JTC 1/SC 29/WG 11/N3966, Information technology—Multimedia Content Description Interface—part 5: Multimedia Description Schemes, Mar. 12, 2001.

"XML Schema Part 1: Structures," W3C Working Draft, May 6, 1999, pp. 1-60.

"XML Schema Part 2: Datatypes," World Wide Web Consortium Working Draft, May 6, 1999, pp. 1-37.

"A Schema for TV-anytime: Segmentation Metadata AN195," NDS Contribution from MyTV, Copyright NDS Limited 2000, pp. 1-27.

"A Schema for TV-Anytime Segmentation Metadata AN195r1," myTV project, Copyright NDS Limited 2000, pp. 1-28.

Christel, Michael G., Hauptmann, Alexander G., Warmack, Adrienne S., and Crosby, Scott S., "Adjustable Filmstrips and Skims as Abstractions for a Digital video Library," Computer Science Department, Carnegie Mellon University, Pittsburgh, PA; pp. 1-7.

Masumitse, Ken and Echigo, Tomio, Video summarization Using Reinforcement Learning in Eigenspace; IBM Research, Tokyo Research Laboratory 1623-14, Shimotsuruma, Yamatoshi, Kanagawa, Japan.

Eickler, Stefan, et al., Content-Based Video Indexing of TV Broadcast News Using Hidden Markov Models, IEEE International Conference on Acoustics, speech and Signal Processing, Phoenix, AZ, 1999, consisting of four pages.

Boreczky, John S., et al., A Hidden Markov Model Framework for video Segmentation Using Audio and Image Features, IEEE International conference on Acoustics, speech and Signal Processing, Seattle, WA 1998, consisting of four pages.

Drew D. Saur, Yap-Peng Tan, Sanjeev R. Kulkarni, and Peter J. Ramadge, "Automated Analysis and Annotation of Basketball Video," SPIE vol. 3022, pp. 176-187.

Selim Aksoy and Robert M. Haralick, "Textural Features for Image Database Retrieval," Intelligent Systems Laboratory, Department of Electrical Engineering, University of Washington, Seattle.

Giridharan Iyengar and Andrew Lippman, "Models for automatic classification of video sequences," SPIE vol. 3312, pp. 216-227.

Hongjiang Zhang, Stephen W. Smoliar and Jian Hua Wu, "Content-Based Video Browsing Tools," SPIE vol. 2417, pp. 389-398.

Bilge Gunsel, Yue Fu and A. Murat Tekalp, "Hierarchical Temporal Video Segmentation and Content Characterization," SPIE vol. 3229, pp. 46-56.

Sunghoon Choi, Yongduek Seo, Hyunwoo Kim, and Ki-Sang Hong, "Where are the ball and players?: Soccer Game Analysis with Color-based Tracking and Image Mosaick," Dept. of EE, Pohang University of Science and Technology, Republic of Korea, pp. 1-15.

Vikrant Kobla, Daniel DeMenthon, and David Doermann, "Identifying Sports Videos Using Replay, Text, and Camera Motion Features," University of Maryland, Laboratory for Language and Media Processing; at least one year prior to filing date; 12 pages.

Richard W. Conners and Charles A. Harlow, "A Theoretical Comparison of Texture Algorithms," IEEE Transactions on Pattern Analysis and Machine Intelligence, vol. PAMI-2, No. 3, May 1980, pp. 204-222.

S. E. Levinson, L. R. Rabiner, and M. M. Sondhi, "An Introduction to the Application of the Theory of Probabilistic Functions of a Markov Process to Automatic Speech Recognition," American Telephone and Telegraph Company, The Bell System Technical Journal, vol. 62, No. 4, Apr. 1983, pp. 1035-1074.

John Canny, "A Computational approach to Edge Detection," IEEE Transactions on Pattern Analysis and Machine Intelligence, vol. PAMI-8, No. 6, Nov. 1986, pp. 679-698.

Lawrence R. Rabiner, "A Tutorial on Hidden Markov Models and Selected Applications in Speech Recognition," Proceedings of the IEEE, vol. 77, No. 2, Feb. 1989, pp. 257-286.

B. B. Chaudhuri, N. Sarkar, and P. Kundu, "Improved Fractal Geometry Based Texture Segmentation Technique," IEEE Proceedings-E, vol. 140, No. 5, Sep. 1993, pp. 233-241.

Alberto Del Bimbo, Enrico Vicario and Daniele Zingoni, "A Spatial Logic for Symbolic Description of Image Contents," Journal of Visual Languages and Computing (1994) 5, pp. 267-286.

Zhang Stephen W. Smoliar and Hongjiang, "Content-Based Video Indexing and Retrieval," IEEE 1994, pp. 62-72.

F. Arman, R. Depommier, A. Hsu, and M-Y. Chiu, "Content-based Browsing of Video Sequences," Proceedings of ACM International Conference on Multimedia '94, Oct. 15-20, San Francisco, CA, USA.

Stephen S. Intille and Aaron F. Bobick, "Visual Tracking Using Closed-Worlds," M.I.T. Media Laboratory Perceptual computing Section Technical Report No. 294, Nov. 1994, pp. 1-18.

Stephen S. Intille, "Tracking Using a Local Closed-World Assumption: Tracking in the Football Domain," M.I.T. Media Lab Perceptual Computing Group Technical Report No. 296, pp. 1-62, Submitted to the Program in Media Arts and Sciences, School of Architecture and Planning on Aug. 5, 1994.

Boon-Lock Yeo and Bede Liu, "On the Extraction of DC Sequence From MPEG Compressed Video," IEEE 1995, pp. 260-263.

Yihong Gong, Lim Teck Sin, Chua Hock Chuan, Hongjiang Zhang, Masao Sakauchi, "Automatic Parsing of TV Soccer Programs," IEEE 1995, pp. 167-174.

Dennis Yow, Boon-Lock Yeo, Minerva Yeung and Bede Liu, "Analysis and Presentation of Soccer Highlights From Digital Video," Proceedings, Second Asian Conference on Computer Vision (ACCV '95).

Michael A. Smith and Takeo Kanade, "Video Skimming for Quick Browsing based on Audio and Image Characterization," Jul. 30, 1995, Carnegie Mellon University, School of Computer Science, Pittsburgh, PA.

Nevenka Dimitrova and Forousan Golshani, "Motion Recovery for video Content Classification," ACM Transactions on Information Systems, vol. 13, No. 4, Oct. 1995, pp. 408-139.

R. W. Picard, "A Society of Models for Video and Image Libraries," IBM Systems Journal, vol. 35, Nos. 3&4, 1996, pp. 292-312.

B.S. Manjunath and W.Y. Ma, "Texture Features for Browsing and Retrieval of Image Data," IEEE Transactions on Pattern Analysis and Machine Intelligence, vol. 18, No. 8, Aug. 1996, pp. 837-842.

Shin'Ichi Satoh and Takeo Kanade, "Name-It: Association of Face and Name in Video,", School of Computer Science Carnegie Mellon University, Pittsburgh, PA, Dec. 20, 1996, pp. 1-17.

Minerva Yeung, Boon-Lock Yeo, and Bede Liu, "Extracting Story Units from Long Programs for Video Browsing and Navigation," IEEE 1996, pp. 296-305.

Wayne Wolf, "Hidden Markov Model Parsing of Video Programs," Proceedings of the 1997 IEEE International Conference on Acoustics, Speech, and Signal Processing, 1997, pp. 2609-2611.

Jonathan D. Courtney, "Automatic Video Indexing via Object Motion Analysis," Pattern Recognition, vol. 30, No. 4, pp. 607-625, 1997.

Minerva M. Yeung, "Video Visualization for Compact Presentation and Fast Browsing of Pictorial Content," IEEE Transactions on Circuits and Systems for Video Technology, vol. 7, No. 5, Oct. 1997, pp. 771-785.

Rainer Lienhart, Silvia Pfeiffer, and Wolfgang Effelsberg, "Video Abstracting," Communications of the ACM, vol. 40, No. 12, Dec. 1997, pp. 55-62.

Boon-Lock Yeo and Minerva M. Yeung, "Retrieving and Visualizing Video," Communications of the ACM, Dec. 1997, vol. 40 No. 12, pp. 43-52.

Mark T. Maybury and Andrew E. Merlino, "Multimedia Summaries of Broadcast News," IEEE 1997, pp. 442-449.

Michael T. Chan, You Zhang and Thomas S. Huang, "Real-Time Lip Tracking and Bimodal Continuous Speech Recognition," 1998.

T. Lambrou, P. Kudumakis, R. Speller, M. Sandler, and A. Linney, "Classification of Audio Signals Using Statistical Features on Time and Wavelet Transform Domains," IEEE 1998, pp. 3621-3624.

Padhraic Smyth, "Belief Networks, Hidden Markov Models, and Markov Random Fields: a Unifying View," Information and Computer Science Department, University of California, Irvine, CA, Mar. 20, 1998, pp. 1-11.

Richard J. Qian, M. Ibrahim Sezan, and Kristine E. Matthews, "A Robust Real-Time Face Tracking Algorithm," IEEE 1998, pp. 131-135.

Dulce Ponceleon, Savitha Srinivasan, Arnon Amir, Dragutin Petkovic, and Dan Diklic, "Key to Effective Video Retrieval: Effective Cataloging and Browsing," ACM, Aug. 1998, pp. 99-107.

Daniel DeMenthon, Vikrant Kobla and David Doermann, "Video Summarization by Curve Simplification," ACM 1998, pp. 211-218.

Nuno Vasconcelos and Andrew Lippman, "Bayesian Modeling of Video Editing and Structure: Semantic Features for Video Summarization and Browsing," IEEE 1998, pp. 153-157.

Toshio Kawashima, Kouichi Tateyama, Toshimasa Iijima, and Yoshinao Aoki, "Indexing of Baseball Telecast for Content-based Video Retrieval," IEEE 1998, pp. 871-874.

M. R. Naphade, R. Mehrotra, A. M. Ferman, J. Warnick, T. S. Huang, A. M. Tekalp, "A High-Performance Shot Boundary Detection Algorithm Using Multiple Cues," Proceedings of IEEE International Conference on Image Processing, Chicago, IL, 1998, pp. 884-887.

John S. Boreczky and Lynn D. Wilcox, "A Hidden Markov Model Framework for Video Segmentation Using Audio and Image Features," Proceedings of IEEE International Conference on Acoustics, Speech, and Signal Processing, Seattle, WA, 1998.

Richard Qian, Niels Haering, and Ibrahim Sezan, "A Computational Approach to Semantic Event Detection," IEEE 1999, pp. 200-206.

Zhu Liu and Quian Huang, "Detecting News Reporting Using Audio/Visual Information," IEEE 1999, pp. 324-328.

Vikrant Kobla, Daniel DeMenthon, and David Doermann, "Detection of Slow-Motion Replay Sequences for Identifying Sports Videos," IEEE Conference, 1999, pp. 135-140.

Rainer Lienhart, "Comparison of Automatic Shot Boundary Detection Algorithms," Part of the IS&T/SPIE Conference on Storage and Retrieval for Image and Video Databases VII, San Jose, California, Jan. 1999, SPIE vol. 3656.

H.B. Lu, Y.J. Zhang, Y.R. Yao, "Robust Gradual Scene Change Detection," Proceedings of IEEE International Conference on Image Processing, Kobe, Japan, 1999.

Stuart J. Golin, "New Metric to Detect Wipes and Other Gradual Transitions in . . . ," Part of the IS&T/SPIE Conference on Visual Communications and Image Processing '99, San Jose, California, Jan. 1999, SPIE vol. 3653, pp. 1464-1474.

Stefan Eickeler and Stefan Muller, "Content-Based Video Indexing of TV Broadcast News Using Hidden Markov Models," Proceedings of IEEE International Conference on Acoustics, speech, and Signal Processing, Phoenix, AZ 1999.

Noboru Babaguchi, "Towards Abstracting sports Video by Highlights," IEEE 2000, pp. 1519-1522.

Ullas Gargi, Rangachar Kasturi, and Susan H. Strayer, "Performance Characterization of Video-Shot-Change Detection Methods," IEEE Transactions on Circuits and Systems for Video Technology, vol. 10, No. 1, Feb. 2000, pp. 1-13.

Yao Wang, Zhu Liu, and Jin-Cheng Huang, "Multimedia Content Analysis," IEEE Signal Processing Magazine, Nov. 2000, pp. 12-35.

Yong Rui, Anoop Gupta, and Alex Acero, "Automatically Extracting Highlights for TV Baseball Programs," ACM Multimedia 2000, Los Angeles, CA, USA, pp. 105-115.

Noboru Babguchi, Yoshihiko Kawai, Yukinobu Yasugi, and Tadahiro Kitahashi, "Linking Live and Replay Scenes in Broadcasted Sports Video," Proceedings of ACM Multimedia 2000 Workshop on Multimedia Information Retrieval (MIR2000), pp. 205-208, Nov. 2000.

Chung-Lin Huang and Chih-Yu Chang, "Video Summarization using Hidden Markov Model," IEEE 2001, pp. 473-478.

H. Pan, P. van Beek, and M. I. Sezan, "Detection of Slow-Motion Replay Segments in Sports Video for Highlights Generation," Proceedings of IEEE International Conference on Acoustics, Speech, and Signal Processing, Salt Lake city, UT, 2001.

Frank R. Kschischang, Brendan J. Frey, and Hans-Andrea Loeliger, "Factor Graphs and the Sum-Product Algorithm," IEEE Transactions on Information Theory, vol. 47, No. 2, Feb. 2001, pp. 498-518.

Peng Xu, Chih-Fu Chang, Ajay Divakaran, Anthony Vetro, and Huifang Sun, "Algorithms and System for High-Level Structure Analysis and Event Detection in Soccer Video," Columbia University, Advent—Technical Report #111, Jun. 2001.

Baoxin Li and M. Ibrahim Sezan, "Event Detection and Summarization in sports Video," to be presented in IEEE Workshop on Content-Based Access of Image and Video Libraries (Joint with CUPR), Kauai, Hawaii, Dec. 2001.

Kawai, et al., "Detection of Replay in Broadcast Sports Video by Focusing on Digital Video Effects," IEICE (D-11), vol. J84-DII, No. 2, pp. 432-435, Feb. 2001, (in Japanese).

Hao Pan, Baoxin Li, and M. Ibrahim Sezan, "Automatic Detection of Replay Segments in Broadcast Sports Programs by Detection of Logos in Scene Transitions," IEEE ICASSP 2002, pp. 3385-3388.

Lexing Xie and Shih-Fu Chang, "Structure Analysis of Soccer Video with Hidden Markov Models," ICASSP, 2002.

Riccardo Leonardi and Perangelo Migliorati, "Semantic Indexing of Multimedia Documents," IEEE 2002 (Apr.-Jun. 2002), pp. 44-51.

Kawashima, T.; Tateyama, K.; Lijima, T.; Aoki, Y.; "Indexing of Baseball Telecast for Content-Based Video Retrieval," Image Processing, 1998. ICIP 98. Proceedings. 1998 International Conference on, vol. 1, pp. 871-874, vol. 1, Oct. 4-7, 1998.

Gargi, U.; Kasturi, R.; Strayer, S.H.; "Performance Characterization of Video-Shot-Change Detection Methods," Circuits and Systems for Video Technology, IEEE Transactions on, vol. 10, No. 1, pp. 1-13, Feb. 2000.

Yao Wang; Zhu Liu; Jin-Cheng Huang; "Multimedia Content Analysis—Using both Audio and Visual Clues," Signal Processing Magazine, IEEE, vol. 17, No. 6, pp. 12-36, Nov. 2000.

Y. Rui, A. Gupta, and A. Acero, "Automatically Extracting Highlights for TV Baseball Programs," Eighth ACM International Conference on Multimedia, pp. 105-115, 2000.

* cited by examiner

 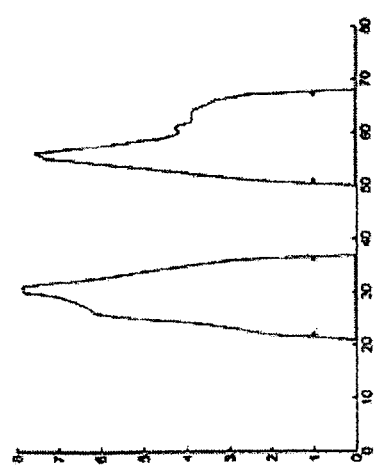
FIG. 9A                FIG. 9B
 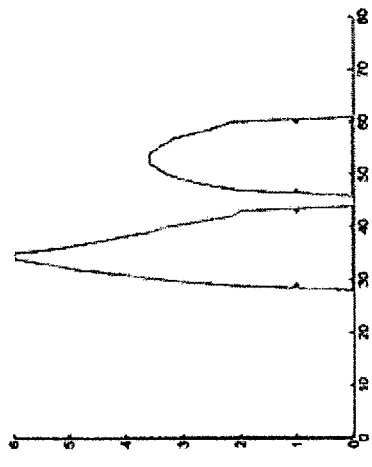
 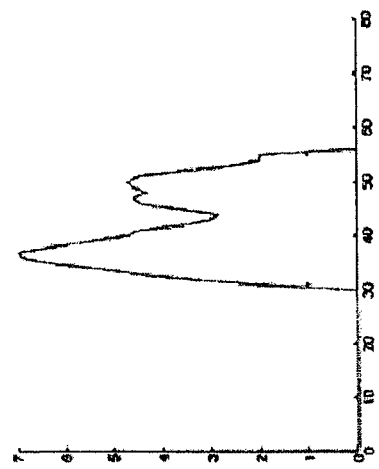
FIG. 9C

SUMMARIZATION OF SUMO VIDEO CONTENT

This application is a divisional of application Ser. No. 10/058,684, filed Jan. 28, 2002 now U.S. Pat. No. 7,120,873.

BACKGROUND OF THE INVENTION

The present invention relates to summarization of video content including sumo.

The amount of video content is expanding at an ever increasing rate, some of which includes sporting events. Simultaneously, the available time for viewers to consume or otherwise view all of the desirable video content is decreasing. With the increased amount of video content coupled with the decreasing time available to view the video content, it becomes increasingly problematic for viewers to view all of the potentially desirable content in its entirety. Accordingly, viewers are increasingly selective regarding the video content that they select to view. To accommodate viewer demands, techniques have been developed to provide a summarization of the video representative in some manner of the entire video. Video summarization likewise facilitates additional features including browsing, filtering, indexing, retrieval, etc. The typical purpose for creating a video summarization is to obtain a compact representation of the original video for subsequent viewing.

There are two major approaches to video summarization. The first approach for video summarization is key frame detection. Key frame detection includes mechanisms that process low level characteristics of the video, such as its color distribution, to determine those particular isolated frames that are most representative of particular portions of the video. For example, a key frame summarization of a video may contain only a few isolated key frames which potentially highlight the most important events in the video. Thus some limited information about the video can be inferred from the selection of key frames. Key frame techniques are especially suitable for indexing video content but are not especially suitable for summarizing sporting content.

The second approach for video summarization is directed at detecting events that are important for the particular video content. Such techniques normally include a definition and model of anticipated events of particular importance for a particular type of content. The video summarization may consist of many video segments, each of which is a continuous portion in the original video, allowing some detailed information from the video to be viewed by the user in a time effective manner. Such techniques are especially suitable for the efficient consumption of the content of a video by browsing only its summary. Such approaches facilitate what is sometimes referred to as "semantic summaries".

What is desired, therefore, is a video summarization technique suitable for video content that includes sumo.

BRIEF DESCRIPTION OF THE DRAWINGS

FIGS. 9A-9C is a series of sequential images in a video clip showing two sumo contestants colliding.

DETAILED DESCRIPTION OF THE PREFERRED EMBODIMENT

Figure 1:
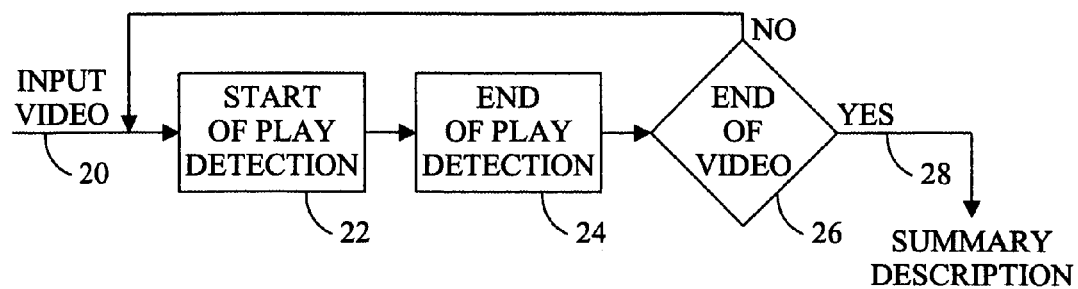
FIG. 1 is an exemplary flowchart for play detection.

Sumo, the national sport of Japan, is tremendously popular in eastern Asia and is growing in popularity elsewhere in the world. Sumo is a sport comprising bouts in which two contestants meet in a circular ring 4.55 meters in diameter. The rules of Sumo are uncomplicated. After the contestants and a referee have entered the circular ring, the bout begins with an initial charge—called a "tachiai"—where each contestant rushes towards, then collides with, the other. The bout will end when one of the contestant loses by either stepping outside the circular ring or touching the ground with any part of the contestant's body other than the soles of the feet. Aside from a limited number of illegal moves, such as gouging the opponent's eyes, striking with a closed fist, or intentionally pulling at the opponent's hair, there are no rules that govern a sumo bout.

Sumo participants may compete against each another in one of a number of tournaments. Japan sponsors six sanctioned Grand Sumo tournaments, held in odd-numbered months throughout the year, in which competitive sumo contestants face one another with the opportunity for advancement in rank. Sumo contestants are ranked under a strict meritocracy; winning bouts in these sanctioned tournaments improves a competitor's rank while losing bouts diminishes that rank. Aside from the six sanctioned tournaments, a number of exhibition tournaments—called Jungyo—are scheduled throughout the year.

Though a sumo tournament will typically take place over several weeks with bouts scheduled throughout each day, most bouts of interest, i.e. those involving higher ranked contestants, are scheduled to begin late afternoon when live television broadcasts of the tournament occur. These portions of the sumo tournaments usually last 2-3 hours each day and are often video recorded for later distribution or for re-broadcast.

Though such a video of a sumo tournament might typically last about 2-3 hours, only about ten minutes turns out to include time during which two players are in a bout. An individual sumo bout is brief; the typical bout will end with the initial collision, though a rare bout might last two to three minutes. Interspersed between bouts are a large number of ceremonies that precede and follow each bout.

Though brief, the time intervals during which a bout is proceeding are intense and can captivate those in the viewing audience, many of whom are able to identify a myriad of named sumo techniques that may occur in rapid succession.

Such techniques include a "kekaeshi" (a foot-sweep), a "kubinage" (a head-lock throw), and an "izori" (a technique where a contestant crouches below the opponent's rush, grabbing one of the opponent's legs, lifting the opponent upon the shoulders and falling backwards), as well as some sixty five to seventy more named sumo techniques or occurrences.

The remaining time during the sumo tournament is typically not exciting to watch on video. Such time would include for example inter-bout changes of players, pre-bout exercises and ceremonies, post-bout ceremonies and in the case of broadcast, nearly endless commercials. While it may indeed be entertaining to sit in an arena for several hours for a sumo tournament, many people who watch a video of a sumo tournament find it difficult to watch all of the tournament, even if they are rabid fans. Further, the tournaments are held during daytime hours, hence many fans are unable to attend a tournament or to watch a live broadcast due to work. Such fans may nonetheless be interested in watching specific bouts or some other condensed version of the tournament. Thus a video summarization of the sumo tournament that provides a summary of the tournament having a duration shorter than the original sumo video, may be appealing to many people. The video summarization should provide nearly the same level of the excitement (e.g. interest) that the original game provided.

Upon initial consideration, sumo would not be a suitable candidate to attempt automated video summarization. Initially, there are nearly an endless number of potential moves that may occur that would need to be accounted for in some manner. In addition, each of these moves may involve significant player motion that is difficult to anticipate, difficult to track, and is not consistent between plays. In addition, the players are flesh toned and the ring is likewise generally flesh toned making identification of the events difficult. Based upon such considerations it has been previously considered impractical, if not impossible, to attempt to summarize sumo.

It is conceivably possible to develop highly sophisticated models of a typical sumo video to identify potentially relevant portions of the video. However, such highly sophisticated models are difficult to create and are not normally robust. Further, the likelihood that a majority of the highly relevant portions of the sumo video will be included in such a video summarization is low because of the selectivity of the model. Thus the resulting video summarization of the sumo tournament may simply be unsatisfactory to the average viewer.

After consideration of the difficulty of developing highly sophisticated models of a sumo video to analyze the content of the sumo video, as the sole basis upon which to create a sumo summarization, the present inventors determined that this technique is ultimately flawed as the models will likely never be sufficiently robust to detect all the desirable content. Moreover, the number of different types of model sequences of potentially desirable content is difficult to quantify. In contrast to attempting to detect particular model sequences, the present inventors determined that the desirable segments of the sumo match are preferably selected based upon a "play". A "play" may be defined as a sequence of events defined by the rules of sumo. In particular, and in one aspect, the sequence of events of a "play" may generally include the time between which the players line up to charge one another and one player loses the bout by either stepping outside the sumo ring or touching the clay surface with a part of his body other than the soles of the feet. A play may also selectively include certain pre-bout ceremonies or events, such as the time during which the contestants throw salt in the ring or stare at one another prior to charging. Normally the "play" should include a related series of activities that could potentially result in a victory by one contestant and a loss by the other contestant.

It is to be understood that the temporal bounds of a particular type of "play" does not necessarily start or end at a particular instance, but rather at a time generally coincident with the start and end of the play or otherwise based upon, at least in part, a time (e.g., event) based upon a play. For example, a "play" starting with the contestants throwing salt into the ring may include the times during which the contestants charge each other. A summarization of the video is created by including a plurality of video segments, where the summarization includes fewer frames than the original video from which the summarization was created. A summarization that includes a plurality of the plays of the sumo match provides the viewer with a shorted video sequence while permitting the viewer to still enjoy the game because most of the exciting portions of the video are provided, preferably in the same temporally sequential manner as in the original sumo video.

Figure 17:
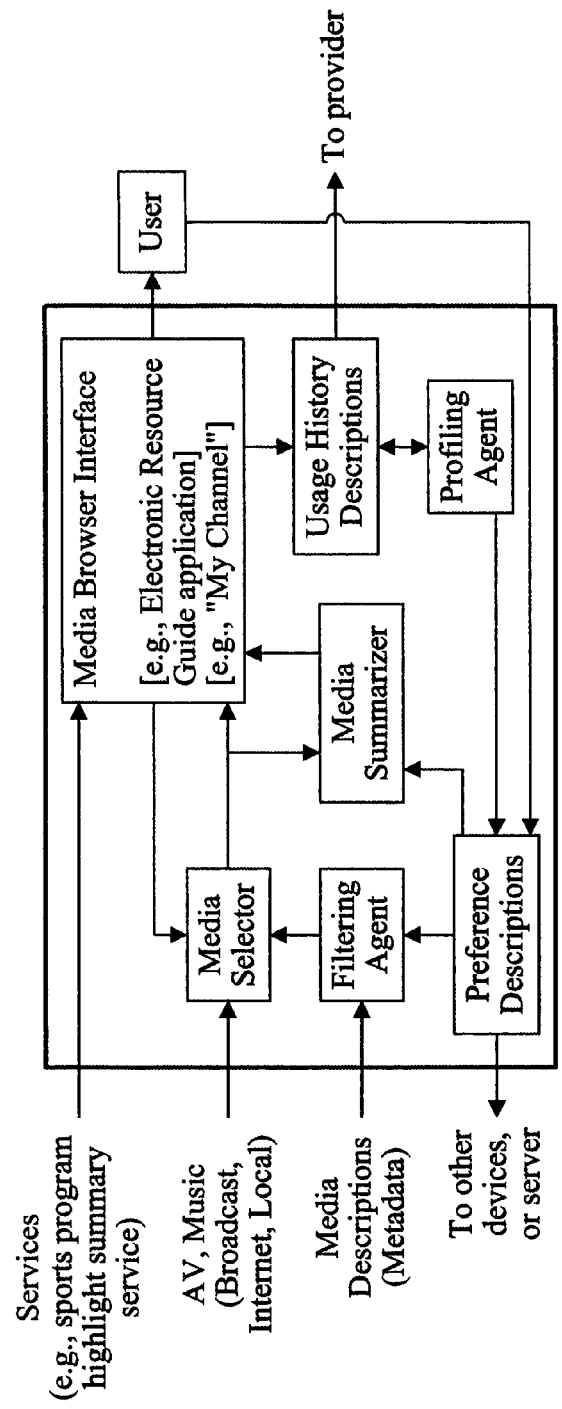
FIG. 17 illustrates the video summarization module as part of a media browser and/or a service application.

Referring to FIG. 1, a procedure for summarization of a sumo video includes receiving a video sequence 20 that includes at least a portion of a sumo match. Block 22 detects the start of a play of a video segment of a plurality of frames of the video. After detecting the start of the play, block 24 detects the end of the play, thereby defining a segment of video between the start of the play and the end of the play, namely, a "play". Block 26 then checks to see if the end of the video (or the portion to be processed) has been reached. If the end of the video has not been reached block 26 branches to block 22 to detect the next play. Alternatively, if the end of the video has been reached then block 26 branches to the summary description 28. The summary description defines those portions of the video sequence 20 that contain the relevant segments for the video summarization. The summary description may be compliant with the MPEG-7 Summary Description Scheme or TV-Anytime Segmentation Description Scheme. A compliant media browser, such as shown in FIG. 17, may apply the summary description to the input video to provide summarized viewing of the input video without modifying it. Alternatively, the summary description may be used to edit the input video and create a separate video sequence. The summarized video sequence may comprise the selected segments which excludes at least a portion of the original video other than the plurality of segments. Preferably, the summarized video sequence excludes all portions of the original video other than the plurality of segments.

FIG. 1 is intended to show a basic procedure for obtaining such a summary, where the summary description contains only the start and end points of the detected plays. The summarization shown in FIG. 1 is primarily a low-level one, though in more complex situations it may contain other information, i.e. names of contestants etc. The benefit of a low-level summary is that it provides sufficient detail for people to appreciate a game from the summary. The low-level summary may then form the basis for a higher level summarization, if desired. As one example, a higher level summary can be obtained by keeping only those plays receiving loud audience acclaims, achieved by adding an audio analysis procedure. Alternatively, in combination with a caption detection/recognition module, a summary can be obtained of only those plays containing a specific contestant. A yet higher summary level may contain only key frames from the plays for indexing purposes.

One component of the summarization procedure depicted in FIG. 1 is the detection of an event, or "play." If the start and end points of all plays are detected, then the system may string all the plays together to obtain a summary from the original video and perform some post processing to smooth the transition boundaries, such as using dissolving techniques to reduce abrupt change between plays and smoothing the audio filed for better auditory effects. Further, the summary should ideally contain only those segments comprising a "play" as earlier defined, thus providing a compact representation of the original tournament; the user can spend only a few minutes to watch it, yet almost all of the excitement of the original game can be appreciated.

One of the difficulties in the detection of a "play" in a sumo broadcast is that frames in one play may sweep a large range of color, yet all the frames belong to the same event, and form an uninterrupted video clip. Thus a generic summarization scheme that uses, for example, a color histogram as the cue for key frame detection or scene classification, may not be particularly effective. In light of such difficulties, the present inventors have developed an alternate method for detecting a "play" that is specifically tailored to sumo content.

Figure 2:
FIG. 2 is an exemplary illustration of a pre-bout scene in sumo.

Still referring to FIG. 1, a summary is to be obtained by first detecting the boundaries of a "play." In a sumo bout, two contestants meet in a ring 4.55 meters across. Though they wear silk belts around their waists, the players are otherwise unclothed. There are strict rules as to where the players and the referee, called a "Gyoji," are to stand in the moments immediately proceeding the initiation of the bout. Cameras are situated at fixed locations around the ring capture the sumo bout. The cameras can typically pan, tilt, and zoom. The primary camera typically is situated opposite to the side where the referee stands. Thus a bout usually starts with a scene as illustrated in FIG. 2, and the bout will almost always be broadcast in its entirety by the primary camera from this vantage. Video captured by any other camera is typically used exclusively for replays, player close-ups, or post-bout ceremonies, all of which take place after the bout has ended. This format is adhered to because the primary camera can best cover the action of the bout, which usually lasts for mere moments, making it impractical to switch camera angles during a bout.

Based on these observations, the inventors have developed a model for "play" detection. A play starts with a scene as in FIG. 2. The time between the scene cut at the end of a current play and the start of the following play is not usually exciting and can thus be excluded from a compact summary. Note that a scene like that shown in FIG. 2 is typically merely a necessary condition, not a sufficient condition. In a sumo tournament, there are many pre-game ceremonies that result in a scene like that shown in FIG. 2, but the contestants, are not yet ready to initiate the bout. Thus in order to detect the start of a play, in addition to finding a scene like that depicted in FIG. 2, it should determine whether the scene is an immediate precursor to the start of a bout. One test would be to determine whether the contestants charge one another and collide, because that is how each bout begins. In other words, the methodology of detecting whether the start of a "play" has occurred involves locating a frame similar to that shown in FIG. 2 then applying a test to determine whether the frame immediately precedes the start of a bout.

The location of frames similar to that shown in FIG. 2 may be based on the anticipated characteristics of the image, as opposed to an actual analysis of the events depicted in the video. Under the assumption that a camera gives a typical start frame like that shown in FIG. 2, one can observe that the lower part of such frame contains the stage in which the sumo ring is defined. The stage in the lower part of the frame is usually of fixed color and lighter than the generally dark color of the upper part of the frame. This is usually true because a sumo stage is to be constructed according to the same specifications. Further, in a sumo tournament the lights are usually focused on the stage which give tends to shroud the background in darkness. In addition, each bout is preceded with the two contestants facing one another in a symmetric position about the center of the ring with the referee to the side and between the contestants and the primary camera facing the referee.

The color of the stage can be estimated from sample data; given a set of sample frames containing the stage, a set of parameters can give an estimate for the stage color. Detecting the players is a more difficult task. Theoretically, one could use complex methods such as those explicitly modeling the shape of a human body. To achieve fast computation, the present inventors have identified a simpler method in describing a player: a player is represented by a color blob with skin tone. Thus assuming that an estimate for skin tone is obtained, two blobs corresponding to the two respective players could be segmented. As mentioned earlier, in a Sumo broadcast, there are pregame ceremonies that could result in frames like a start frame. To enable this type of false alarm to be eliminated, the players should be tracked after they are detected to see if they move towards each other and eventually collide with each other, as would occur at the beginning of a "play" as earlier defined.

Figure 3:
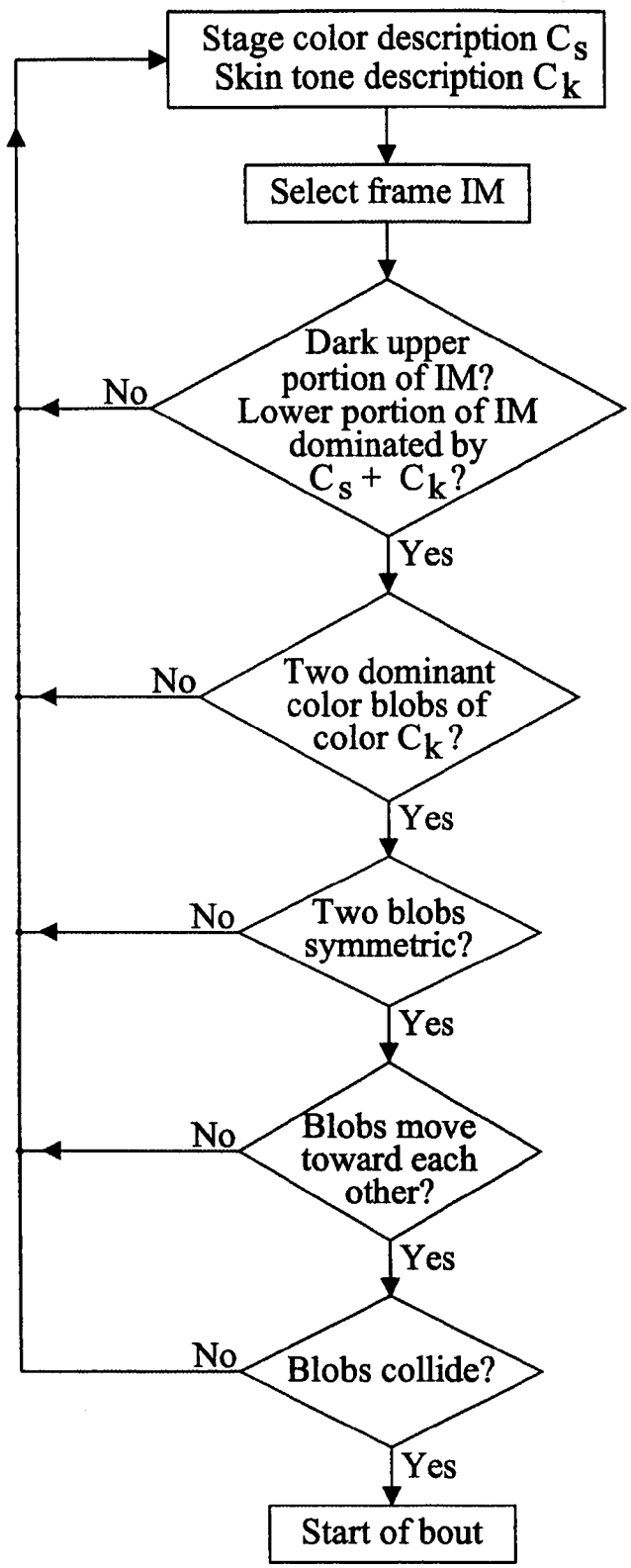
FIG. 3 is a technique for detecting a start frame of a sumo "play.".

One method for detecting the beginning of a play may proceed as shown in FIG. 3. Given a stage color description Cs and skin tone description Ck, a video frame image IM can be examined to determine whether the image represents the beginning of a "play." The color descriptions, may be for example, a single color, a range of colors, a set of colors, in one or more color spaces. First, the image is examined to determine if it has a dark upper portion and a lower portion dominated (25% or more, 50% or more, or 75% or more) by the color Cs+Ck. If not, then the image is determined as a non-start frame. If yes, then the image is examined to determine whether there are two dominant (25% or more, 50% or more, or 75% or more) color blobs of color Ck, nearly symmetric to each other with respect to a generally center column (+/−20% of the width of the frame off center) of the frame. If not, then the image is determined as a non-start frame. If yes, subsequent frames are examined to determine whether the two dominant color blobs move towards, and eventually collide with, one another. If so, the original frame image IM is determined a start frame, otherwise it is determined not to be a start frame. The technique may be modified to include fewer tests or additional tests, in the same or a different sequence.

It turns out that a difficult part of this method is to segment the player blobs from the stage because the stage color Cs and the skin tone Ck are overlapping in typical color space. It is impossible to perfectly separate skin from the stage only using color information, which means that the player detection is always imperfect and the players are usually detected as fragmented pieces. In fact, this is inevitable, considering that the players often wear belts of various non-skin tone color. If a single blob is to be detected for each player, then an additional module must be used to group the fragmented pieces. This module may again introduce additional inaccuracies, aside from the demand for additional computation.

Figure 4:
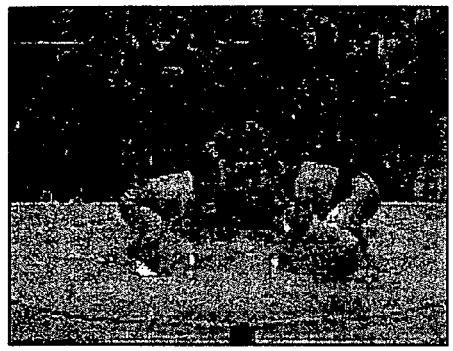
FIG. 4 is a pre-bout scene in sumo.
Figure 5:
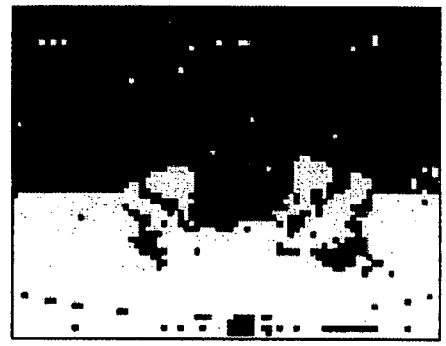
FIG. 5 illustrates the skin color and ring color of FIG. 4.
Figure 6:
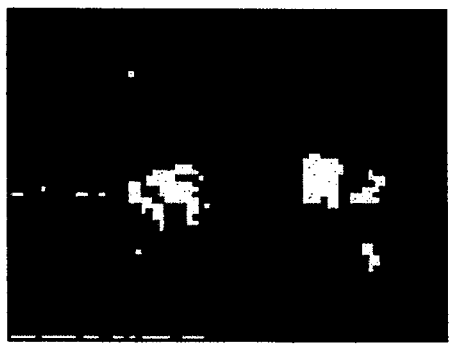
FIG. 6 illustrates binarized skin color of FIG. 5.

To avoid the computational burden and potential inaccuracies of such a grouping procedure, the present inventors discovered that the foregoing method for detecting the beginning of a play may be implemented by representing and tracking the blobs through their one-dimensional projections. FIG. 4 shows a candidate image IM that is a representative start frame of a sumo "play" as earlier defined, and thus should be detected by the summarization procedure shown in FIG. 1. Given the stage color description Cs and the skin tone description Ck, the candidate image shown in FIG. 4 may be reduced to the image shown in FIG. 5 where white pixels indicate a place where there is a pixel in the candidate image corresponding to either the stage color Ck or the skin color Cs. The black pixels represent the dark background areas of the candidate image. The image may be further decomposed using skin-tone based segmentation to isolate those portions of the image corresponding to the skin color Cs. A binary image, shown in FIG. 6 may be used to represent the obtained body parts, in which numeral ones represent a pixel of that location representing skin in the original image. This binary image may be projected along vertical and horizontal axes, shown in FIGS. 7 and 8, respectively. The analysis of the blob may be performed on those projections. The proposed projection behaves effectively like an integration process, which makes the algorithm less sensitive to imperfection in the skin/stage segmentation. Note that in these projections, small and isolated peaks have been suppressed.

Figure 7:
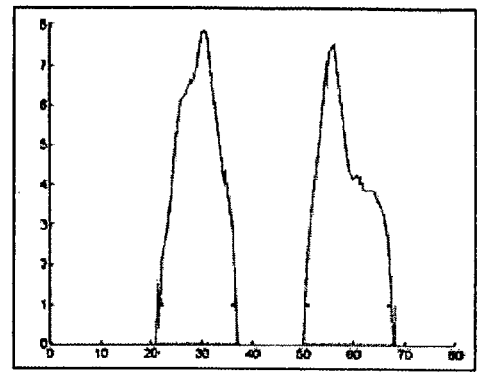
FIG. 7 is a horizontal projection of FIG. 6.
Figure 8:
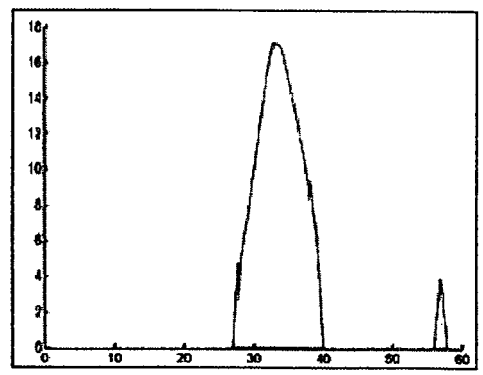
FIG. 8 is a vertical projection of FIG. 6.

Ideally, a real start frame will result in two peaks of similar size in the vertical projection, nearly symmetric about the center column of the image, as shown in FIGS. 7 and 8, the horizontal projection of the binary image, may be used to check whether the two blobs are symmetric about a center column of the image. In subsequent frames, these two peaks should move closer and closer, eventually converging, as illustrated by FIGS. 10A, 10B, and 10C.

The foregoing method relies mainly on color cues, and prior knowledge about the stage color Cs and the skin tone Ck are assumed. However, it is also possible to calibrate the colors for a specific bout or tournament. With other inputs such as a human operator's interactions, the calibration is of course easy to do. Without any human interaction, statistical models can still be used to calibrate the color. If a series of start scene candidates has been obtained, statistical outliers in this set can be detected with prior coarse knowledge about Cs and Ck. The remaining candidate frames can then be used to estimate the specifics of the colors. With the colors calibrated, the start-of-play detection can be performed more accurately.

Figure 10:
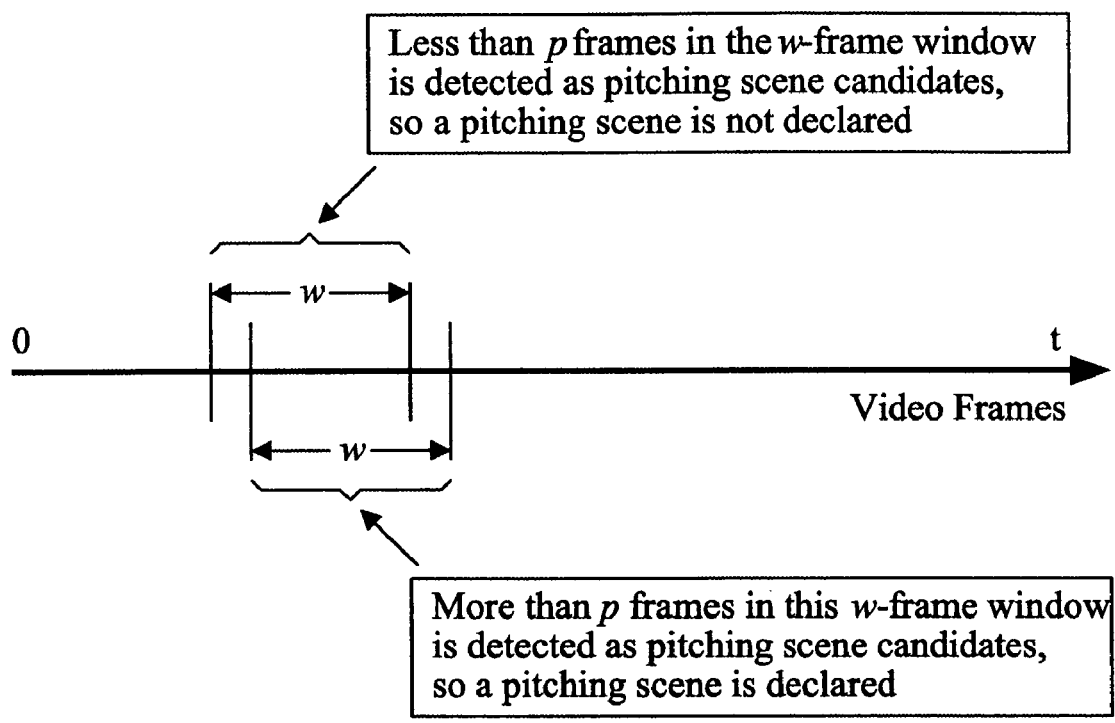
FIG. 10 is an illustration of temporal evidence accumulation.

The foregoing method is able to detect start frames successfully in most situations. However, if the detection of a start frame is declared after finding only one candidate frame, then the method may be susceptible to false-positives. By examining a set of consecutive frames (or other temporally related frames) and accumulating evidence, the system can reduce the false-positive rate. Referring to FIG. 10, the following approach may be used to achieve temporal evidence of accumulation: when detecting the start of a "play", a sliding window of width w is used (e.g., w frames are considered at the same time). A start is declared only if more than p out of the w frames in the current window are determined to be start scene candidates, as previously described. A suitable value of p is such that p/w=70%. Other statistical measures may be used of a fixed number of frames or dynamic number of frames to more accurately determine start scenes.

While the start of a "play" may be found according to the aforementioned method, the end of a "play" can occur in a variety of different ways due to the numerous techniques used to either force the opposing contestant to the ground or out of the ring. Image analysis techniques may be used to analyze the image content of the frames after the beginning of a bout to attempt to determine what occurred, but with the nearly endless possibilities and the difficulty of interpreting the content of the frames, this technique is at least, extremely difficult and computationally intensive. In contrast to attempting to analyze the content of the subsequent frames of a potential play, the present inventors determined that a more efficient manner for the determination of the extent of a play in sumo is to base the end of the play on camera activities. After analysis of a sumo video the present inventors were surprised to determine that the approximate end of a play may be modeled by scene changes, normally as a result of switching to a different camera or a different camera angle. The different camera or different camera angle may be modeled by determining the amount of change between the current frame (or set of frames) to the next frame (or set of frames).

Figure 11:
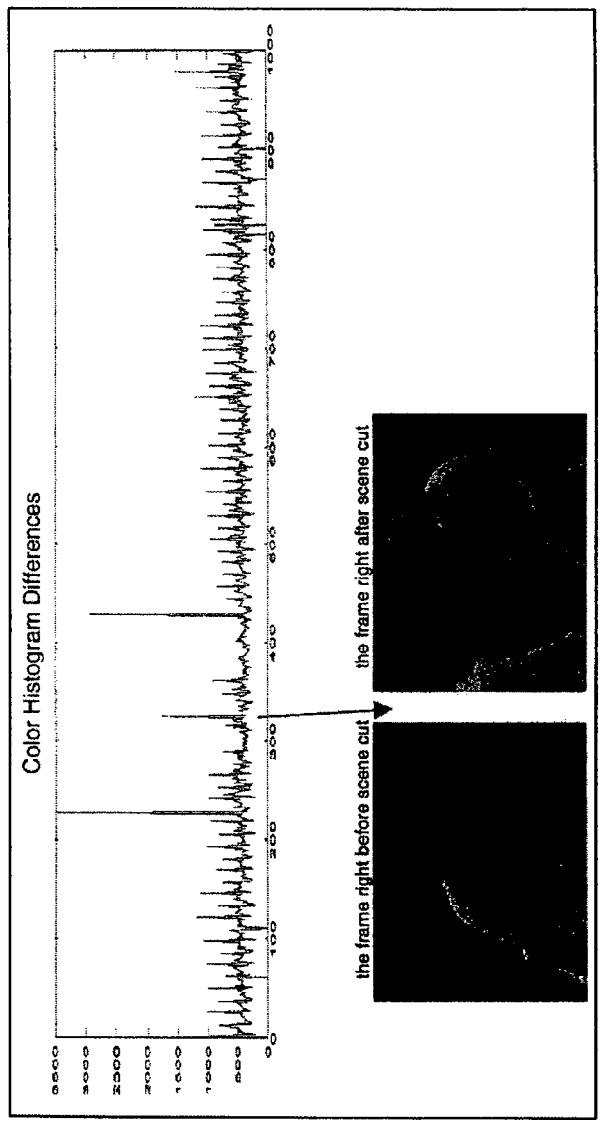
FIG. 11 is an illustration of color histogram differences.
Figure 12:
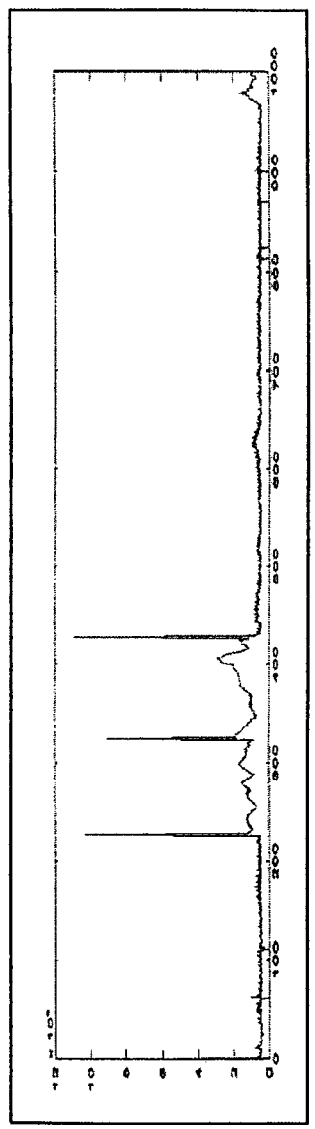
FIG. 12 is an illustration of absolute pixel-to-pixel differences in luminance domain.

Referring to FIG. 11, a model of the amount of change between frames using a color histogram difference technique for an exemplary 1,000 frame video sumo clip is shown. The peaks typically correspond to scene cuts. Unfortunately, FIG. 11 demonstrates, some scene cuts, like the one depicted at around frame 325, the camera break produces a relatively low peak in the color histogram difference curve, causing potential failure in scene cut detection.

Figure 13:
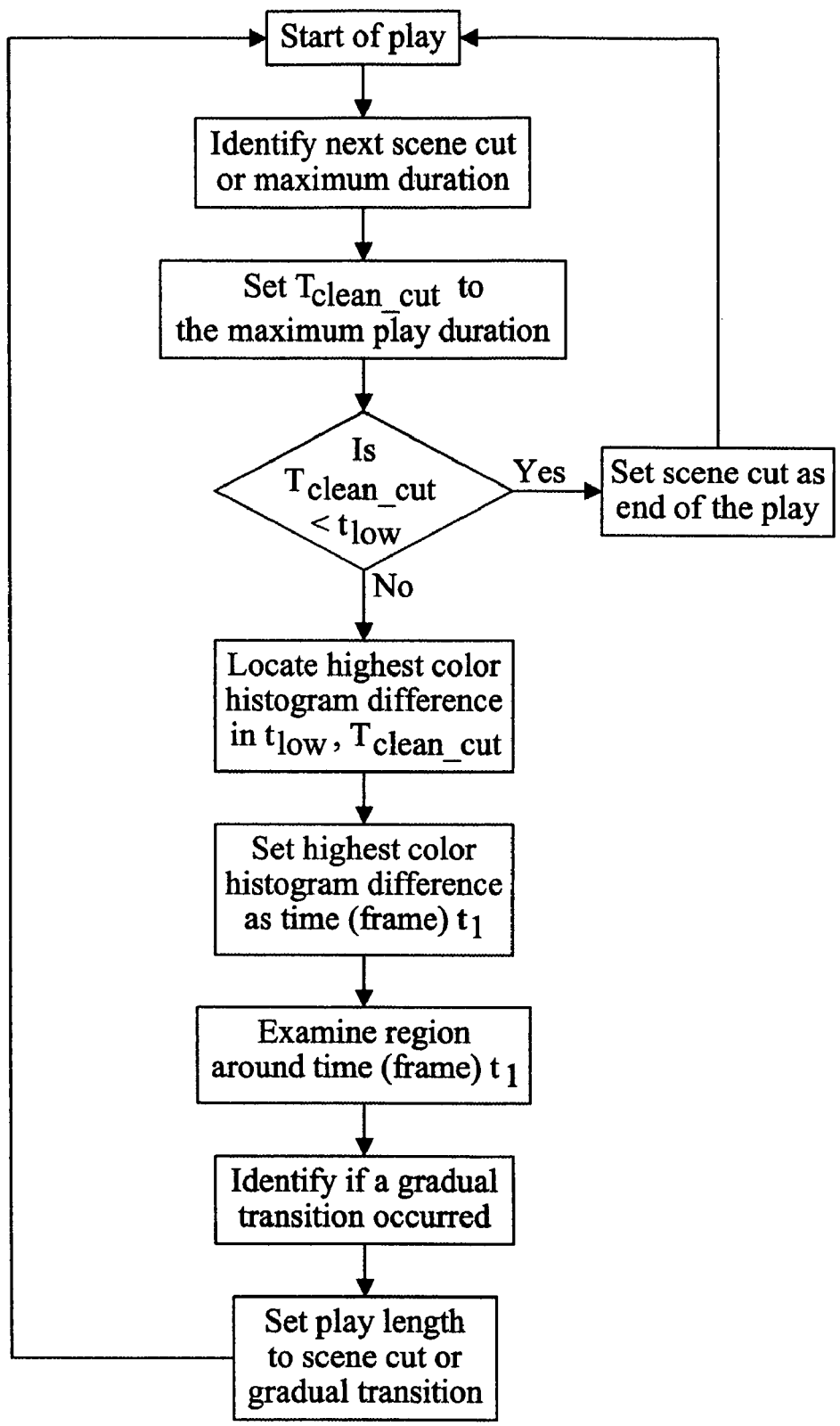
FIG. 13 illustrates scene cut detection.

To solve this problem, the inventors have discovered that the use of color histogram differences in conjunction with the sum of absolute pixel-to-pixel differences in the luminance domain is more effective when detecting a scene cut. To gain robustness in using the sum of absolute pixel-to-pixel differences, the luminance images are first down-sampled, or smoothed. FIG. 13 shows the sum of absolute pixel-to-pixel luminance differences for the same video clip as shown in FIG. 11.

Even with the aforementioned technique there may be some false detections which do not correspond to a real play. Also, there are situations in which a play is broken into two segments due to for example, dramatic lighting fluctuations (mistaken by the system as a scene cut). Some of these problems can be remedied by post-processing. One example of a suitable post processing technique is if two plays are only separated by a sufficiently short time duration, such as less than a predetermined time period, then they should be connected as a single play. The time period between the two detected plays may be included within the total play, if desired. Even if the two detected plays are separated by a short time period and the system puts the two plays together, and they are in fact two separate plays, this results in an acceptable segment (or two plays) because it avoids frequent audio and visual disruptions in the summary, which may be objectionable to some viewers. Another example of a suitable post processing technique is that if a play has a sufficiently short duration, such as less than 2 seconds, then the system should remove it from being a play because it is likely a false positive. Also, post-processing may be applied to smoothen the connection between adjacent plays, for both video and audio.

Sumo video may also include gradual transitions between plays and other activities, such as commentary. These gradual transitions tend to be computationally complex to detect in the general case. However, in the case of sumo it has been determined that detecting gradual transitions based upon the color histogram differences is especially suitable. Other techniques may likewise be used. Referring to FIG. 13, the preferred technique may include starting from a start-of-play time ($t_o$) and looking forward until a sufficiently large scene change is detected or until time $t_o+t_p$ is reached, whichever occurs first. $T_p$ relates to the maximum anticipated play duration and therefore automatically sets a maximum duration to the play. This time period for processing to locate gradual transitions is denoted as $t_{clean\_cut}$. If $t_{clean\_cut} < t_{low}$ then the system will not look for a gradual scene cut and set the previously detected scene cut as the end of the play. This corresponds to an anticipated minimum time duration for a play and $t_{low}$ is used to denote the minimum time period. Otherwise, the system looks for the highest color histogram difference in the region $t_{low}$, $t_{clean\_cut}$ or other measure of a potential scene change. This region of the segment is from the minimum time duration to the next previously identified scene cut. This identifies the highest color histogram difference in the time duration which may be a potential scene change. The time of the highest color histogram difference is identified at $t_1$. In a neighborhood of $t_1$, $[t_1-c_1, t_2+c_2]$, a statistical computation is performed, such as computing the mean $m_1$ and the standard deviation F of the color histogram differences. $C_1$ and $c_2$ are constants or statistically calculated temporal values for the region to examine around the highest color histogram difference. A mean filtering emphasizes regions having a relatively large difference in a relatively short time interval. If the color histogram differences at $t_1$ exceeds $m_1+c_3*F_1$, where $c_3$ is a constant (or otherwise) and some of its neighbors (or otherwise) are sufficiently large, then the system considers a gradual transition to have occurred at around time (frame) $t_1$. The play inset to the shorter of the previously identified scene cut or the gradual transition, if any.

Figure 14:
FIG. 14 illustrates names in a sumo video.

The summary obtained by the method described above contains only play segments from the original video. Even though a Sumo fan may be able to quickly recognize the players after they appear, it may help a viewer to follow the game better if we detect those pre-play frames that contains player's names. An example of such type of frames is given in FIG. 14.

There are various ways of detecting overlaid graphical text content from an original image or video. In this application, the problem is one of detecting Kanji (Chinese characters used in Japanese) in images. With sufficient sample data, the system may train a convolution neural network to perform this task. In Sumo broadcasting there are a few special patterns that are typically adopted in presenting the graphical characters. For example, the names of the two players are the biggest characters. Also, it appears that the names normally appear in white (or substantial contrast to the background). This is probably due to the fact that the names are usually overlaid on a dark scene of the sumo stadium. In addition the graphical information is symmetric with respect to the center column, with one player's information on the left, and the other player's information on the right. The characters read vertically from top to bottom.

These special patterns can be utilized to facilitate a neural network based character detection module. The system may include an algorithm to find frames with these patterns. The present inventors have found that the following set of rules may successfully detect frames with the desired player names in a video: (1) the frame has white blocks that are nearly symmetrically distributed about the center column of the image; (2) except for these white blocks, there should be no other white areas of significant size in the frame; (3) these white blocks persist for at least a few seconds; and (4) the set of frames with persistent white blocks proceeds to the start of a play. One or more of these rules may be included, as desired.

After the frames with the player names are detected, the system may add them to their respective plays and obtain a new summary. Unlike the baseline summary obtained before, in this new summary, there are a few seconds of video like that in FIG. 14 for introducing each play. Thus the new summary is easier to follow.

If desired, a slow motion replay detection module may be incorporated. The system detects if a slow motion replay has occurred, which normally relates to important events. The system will capture the replays of plays, the same as the typical non-slow motion replay (full speed), if the same type of camera angles are used. The play segments detected may be identified with multiple characteristics, namely, slow motion replay-only segments, play only segments without slow motion replay segments, and slow motion replay that include associated full speed segments. The resulting summary may include one or more of the different selections of the aforementioned options, as desired. For example, the resulting summary may have the slow-motion replays removed. These options may likewise be user selectable.

While an effective summarization of a sumo video may be based on the concept of the "play", sometimes the viewer may prefer an even shorter summarization with the most exciting plays included. One potential technique for the estimation of the excitement of a play is to perform statistical analysis on the segments to determine which durations are most likely to have the highest excitement. However, this technique will likely not provide sufficiently accurate results. Further, excitement tends to be a subjective measure that is hard to quantify. After further consideration the present inventors came to the realization that the audio provided together with the video provides a good indication of the excitement of the plays. For example, the volume of the response of the audience and/or the commentators provides a good indication of the excitement. The louder audience and/or commentator acclamations, the greater the degree of excitement.

Figure 15A:
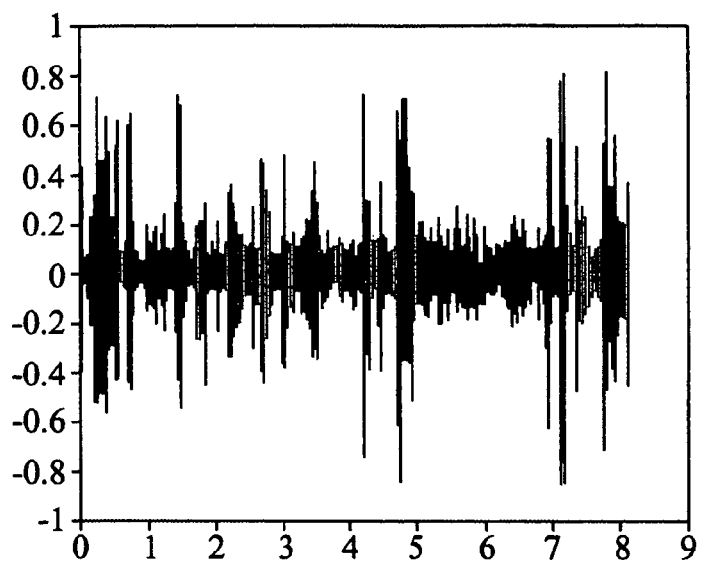
FIGS. 15A-15C illustrate audio segments of different plays.
Figure 15B:
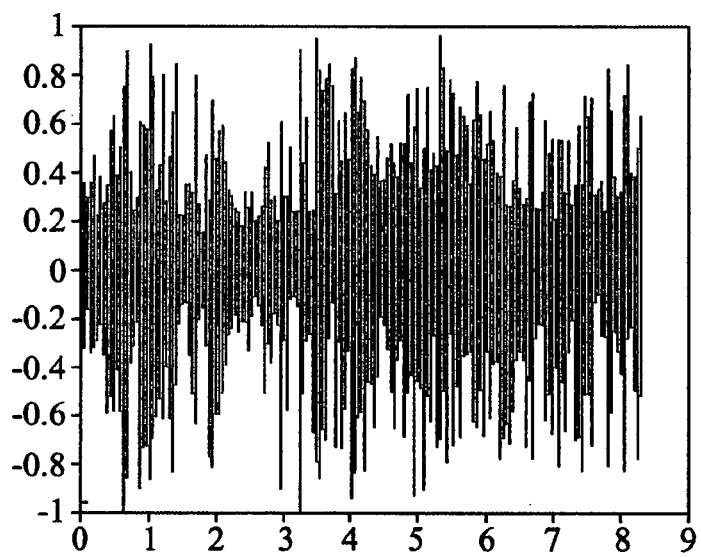
Figure 15C:
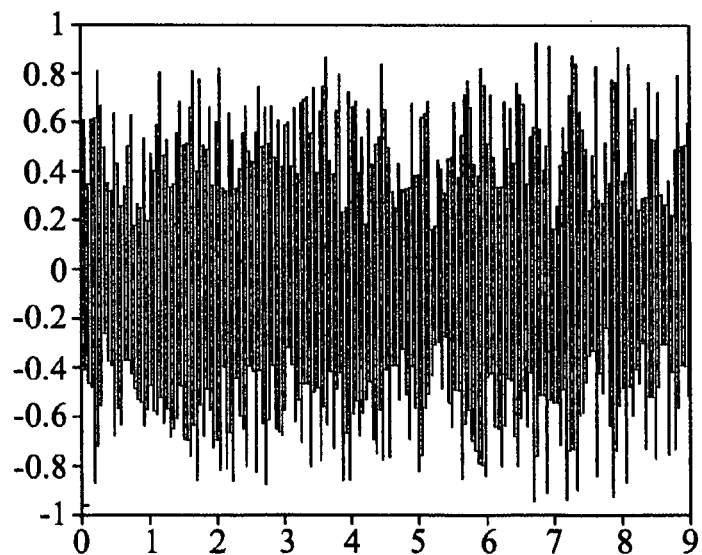

Referring to FIGS. 15A-15C, an exemplary illustration is shown of audio signals having a relatively quiet response (FIG. 15A), having a strong response (FIG. 15B), and having an extremely strong response (FIG. 15C). In general, it has been determined that more exciting plays have the following audio features. First, the mean audio volume of the play is large. The mean audio volume may be computed by defining the mean volume of a play as $$v = \frac{1}{N}\sum_{i=0}^{N-1} S^2(i)$$

where S(i) is the i-th sample, and the N is the total number of samples in the play. Second, the play contains more audio samples that have middle-ranged magnitudes. The second feature may be reflected by the percentage of the middle-range-magnituded samples in the play, which may be computed as $$P = \frac{1}{N}\sum_{i=0}^{N-1} I(\_s(i)\_ > t1 \text{ and } \_s(i)\_ < t2)$$

with I( ) being the indicator function (I(true)=1, and I(false)=0), t1 and t2 are two thresholds defining the middle range.

Figure 16:
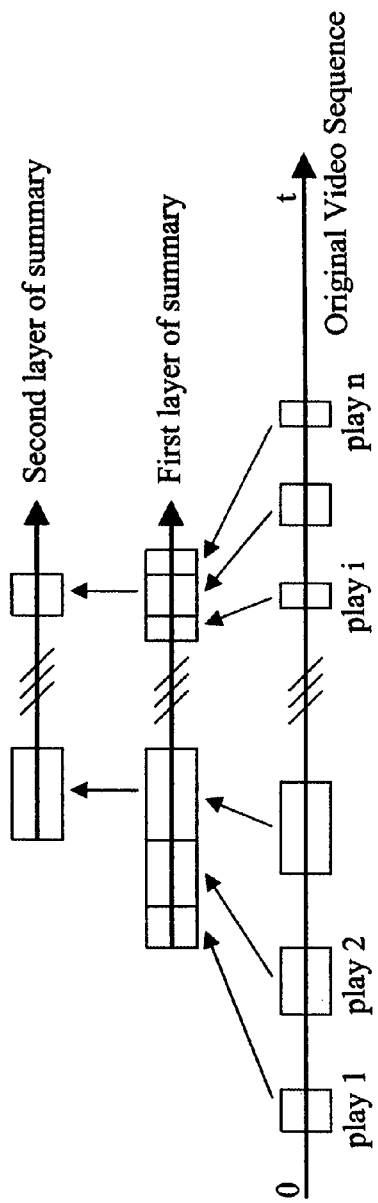
FIG. 16 illustrates forming a multi-layered summary of the original video sequence.

Referring to FIG. 16, the first layer of the summary is constructed using the play detection technique. The second and third layers (and other) are extracted as being of increasingly greater excitement, based at least in part, on the audio levels of the respective audio of the video segments. Also, it would be noted that the preferred audio technique only uses the temporal domain, which results in a computationally efficient technique. In addition, the level of the audio may be used as a basis for the modification of the duration of a particular play segment. For example, if a particular play segment has a high audio level then the boundaries of the play segment may be extended. This permits a greater emphasis to be placed on those segments more likely to be exciting. For example, if a particular play segment has a low audio level then the boundaries of the play segment may be contracted. This permits a reduced emphasis to be placed on those segments less likely to be exciting. It is to be understood that the layered summarization may be based upon other factors, as desired.

Referring to FIG. 17, the video summarization may be included as part of an MPEG-7 based browser/filter, where summarization is included within the standard. The media summarizer may be as shown in FIG. 1. With different levels of summarization built on top of the aforementioned video summarization technique, the system can provide the user with varying levels of summaries according to their demands. Once the summary information is described as an MPEG-7 compliant XML document, one can utilize all the offerings of MPEG-7, such as personalization, where different levels of summaries can be offered to the user on the basis of user's preferences described in an MPEG-7 compliant way. Descriptions of user preferences in MPEG-7 include preference elements pertaining to different summary modes and detail levels.

In the case that the summarization is performed at a server or service provider, the user downloads and receives the summary description encoded in MPEG-7 format. Alternatively, in an interactive video on demand (VOD) application, the media and its summary description reside at the provider's VOD server and the user (e.g., remote) consumes the summary via a user-side browser interface. In this case, the summary may be enriched further by additional information that may be added by the service provider. Further, summarization may also be performed by the client.

Figure 18:
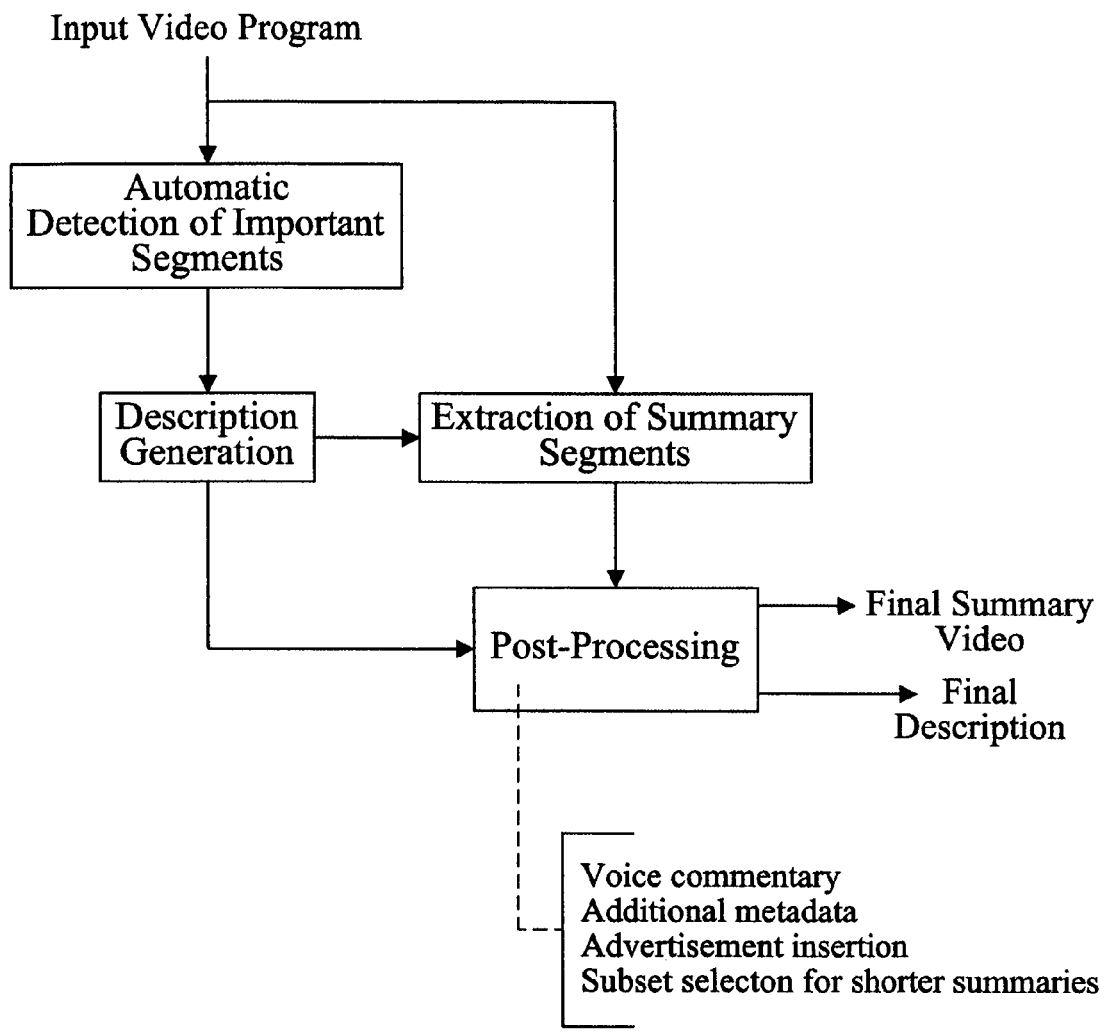
FIG. 18 illustrates a video processing system.

Referring to FIG. 18, the output of the module that automatically detects important segments may be a set of indices of segments containing plays and important parts of the input video program. A description document, such as an MPEG-7 or TV-Anytime compliant description is generated in The Description Generation module. Summary segments are made available to the Post-Processing module by The Extraction of Summary Segments module which processes the input video program according to the description. A post-processing module processes the summary Segments and/or the description to generate the final summary video and final description. The post-processing module puts the post-processed segments together to form the final summary video. The post-processing module may transcode the resulting video to a format different that of the input video to meet the requirements of the storage/transmission channel. The final description may also be encoded, e.g., binarized if it is generated originally in textual format such as XML. Post-processing may include adding to the original audio track a commentary, insertion of advertisement segments, or metadata. In contrast to play detection, post-processing may be completely, or in part, manual processing. It may include, for example, automatic ranking and subset selection of events on the basis of automatic detection of features in the audio track associated with video segments. This processing may be performed at the server and then the resulting video transferred to the client, normally over a network. Alternatively, the resulting video is included in a VOD library and made available to users on a VOD server.

Figure 19:
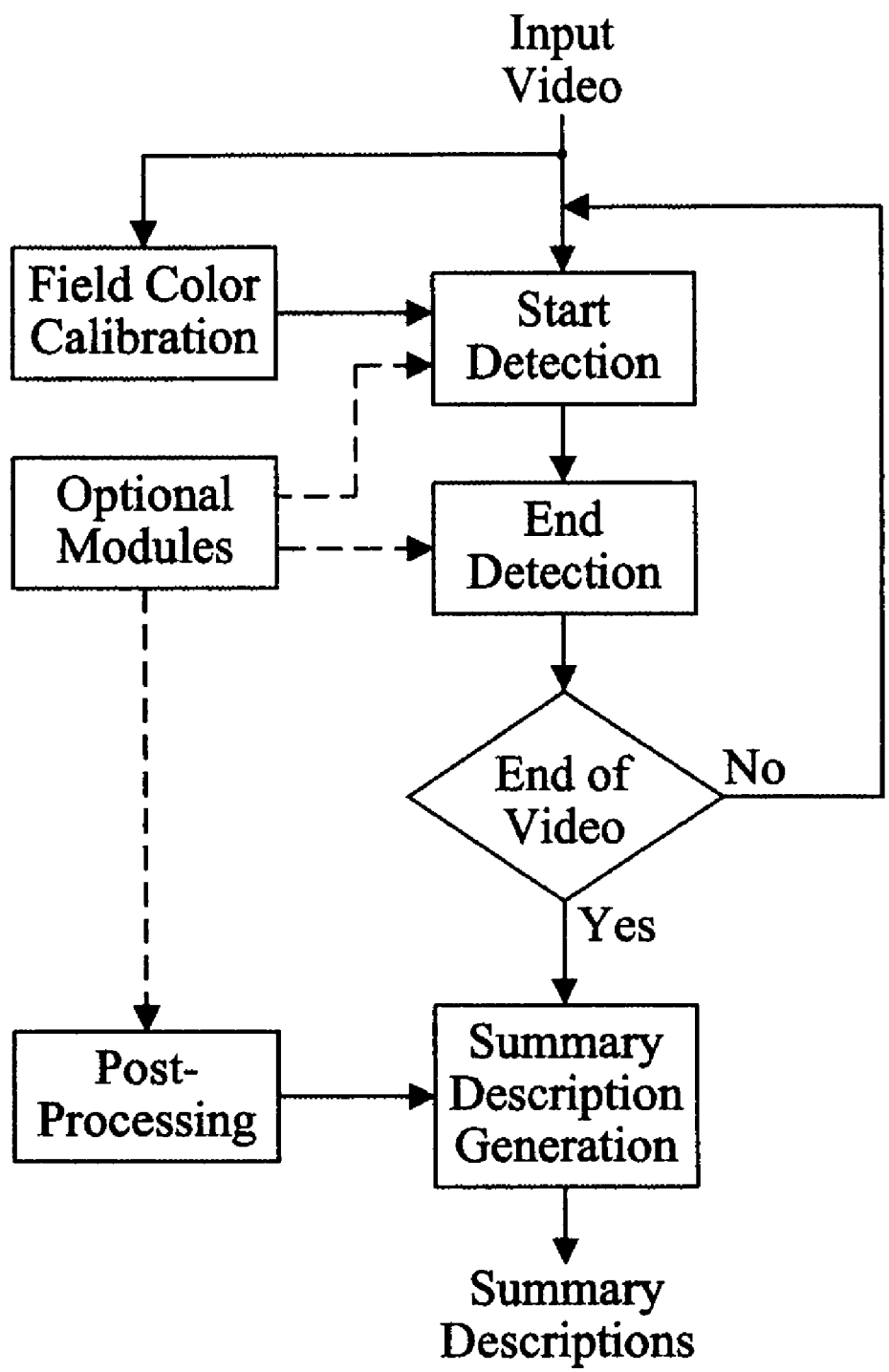
FIG. 19 illustrates an exemplary overall structure of the sumo summarization system.

Referring to FIG. 19, a system may be developed that incorporates start detection of a play, end detection of a play, and summarization. The detection technique may be based upon processing a single frame, multiple frames, or a combination thereof.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method of processing a video having a plurality of frames, said method comprising:
   a) processing image pixels of said video in a manner that automatically identifies a first plurality of segments of said video that respectively display Sumo bouts of likely interest to a viewer, wherein said processing is free from a need to compare characteristics of any frame of said video to characteristics of frames of model sequences and free from a need to reference a text-based description of any sequence of frames of said video, by inferring the start of said Sumo bouts of likely interest to a viewer from a comparison among data of said video, where said video includes a second plurality of segments not of likely interest to said viewer, and said first plurality of segments of said video omits at least one segment of said second plurality of segments;
   (b) creating a text-based description of the identified said segments in response to the identification of said plurality of segments, said text-based description not being graphically presented in the pixel data of any frame of said video being processed;
   (c) automatically selecting at least one segment of said video using said text-based description;
   (d) generating a video summary in response to the selection of said segments, wherein said video summary includes frames of said video and has less frames than said video; where
   (e) each of said Sumo bouts is characterized by a start time based upon when the players line up to charge one another and an end time based upon when one of the players either:
      (1) steps outside a ring bounding an area of play; or
      (2) touches ground with a part of his body other than the feet and where said at least one segment each has a first frame proximately corresponding to said start time and a last frame proximately corresponding to said end time.

2. The method of claim 1 where said first frame is selected so as to include in said at least one segment at least a portion of a pre-bout ceremony.

* * * * *